Patented Oct. 7, 1930

1,777,874

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF TREATING RUBBER AND PRODUCT OBTAINED THEREBY

No Drawing. Original application filed March 2, 1928, Serial No. 258,670. Divided and this application filed March 2, 1928. Serial No. 258,680.

This invention relates to the treatment of rubber and similar materials and to the products obtained thereby.

One object of the invention is to retard the action of the herein described compounds by the addition of acid material. Another object is to provide a method whereby the acid material may be introduced into the rubber.

In the present practice of the use of accelerators, it is generally known that many of the compounds employed are so powerful that they cause a prevulcanization, or burning on the mixing mill. This serious disadvantage is possessed by many of the accelerators which have the property of vulcanizing rubber at ordinary temperatures or at temperatures well below those ordinarily employed in hot vulcanization, for example at 212° or thereabouts. Illustrations of such rapid accelerators are metallic dithiocarbamates, metallic salts of other thioacids, mercapto thiazoles and the like. According to the present invention this serious objection of prevulcanization may be entirely overcome, the rubber compounds may be mixed upon the mill with practically no danger of prevulcanization thereon, without sacrificing the accelerating power which is desired. Certain of the compounds forming the subject matter of the present invention may be mixed with rubber with entire safety on the mixing mills, subject to the conditions hereinafter named, whereas others may be safely mixed, observing certain precautions as to mill temperature, etc.

The invention includes combining rubber and similar vulcanizable materials with a vulcanizing combination, including a vulcanizing agent, a metallic oxide or its equivalent, and a substance containing the radical $$\underset{X}{\overset{RCSY}{\underset{\|}{}}}$$

and vulcanizing the rubber. The invention also includes the products thus obtained. In $$\underset{X}{\overset{RCSY,}{\underset{\|}{}}}$$

R represents any element, preferably nitrogen, oxygen, carbon, or sulphur; X represents any bivalent element such as sulphur or oxygen, or a trivalent element as in the case of a thiazole; R and X may or may not be parts of a ring. Y is a carbon atom in an organic group attached at the S of the $$\underset{X}{\overset{RCS-}{\underset{\|}{}}}$$

radical, and is not doubly bonded to sulphur or oxygen which group is so substituted that the whole compound which comprises the radical $$\underset{X}{\overset{RCSY}{\underset{\|}{}}}$$

will react at the thiol sulphur-carbon bond, i. e., at SY, with sodium hydroxide in boiling aqueous alcohol at least as rapidly as diphenylmethyl dimethyl dithiocarbamate reacts under the same conditions. This case is a division of copending application Serial No. 258,670, filed of even date.

The invention further consists in retarding the action of the accelerating compounds and particularly the burning of the rubber compounds by the addition of acid materials. The invention further consists in introducing the acid materials by diffusion from rubber or from any surrounding medium.

It will be seen from the list of compounds given below that in the dithiocarbamates R is nitrogen, in the xanthogenates R is oxygen, in the dithiobenzoates R is carbon, and in the thiazoles R is sulphur; X is sulphur in the dithiocarbamates, xanthogenates, and dithiobenzoates, and is the substituted nitrogen in the thiazoles. The mercapto thiazoles also afford an example in which the R and X are parts of a ring.

The characteristic group of these new compounds may be conveniently illustrated as follows:

$$\underset{X}{\overset{RCSY}{\underset{\|}{}}}$$

Y=A carbon atom in a substituted cyclic group $$\underset{S \ -N}{\overset{NCSY}{\underset{\|}{}}} \quad \underset{S}{\overset{SCSY}{\underset{\|}{}}} \quad \underset{S}{\overset{OCSY}{\underset{\|}{}}} \quad \underset{S}{\overset{CCSY}{\underset{\|}{}}}$$

Y=A carbon atom in a substituted methyl group $$\underset{S \ -N}{\overset{NCSY}{\underset{\|}{}}} \quad \underset{S}{\overset{SCSY}{\underset{\|}{}}} \quad \underset{S}{\overset{OCSY}{\underset{\|}{}}} \quad \underset{S}{\overset{CCSY}{\underset{\|}{}}}$$

As illustrations of groups comprising Y, in which Y is a carbon atom in a substituted cyclic group, the following may be given: 2-4 dinitrophenyl, 2-6 dinitro 4 chlorophenyl, 2-4-6 trinitrophenyl (picryl) etc. As illustrations in which Y is the methyl carbon atom in a substituted methyl group, the following may be used: diphenyl methyl, triphenyl methyl, phenyl methylene (benzal) trimethyl methyl (tertiary butyl), phenyl chlor methylene phthalimido methyl, diiodomethyl, allyl, etc. Representative constitutional formulas are as follows:

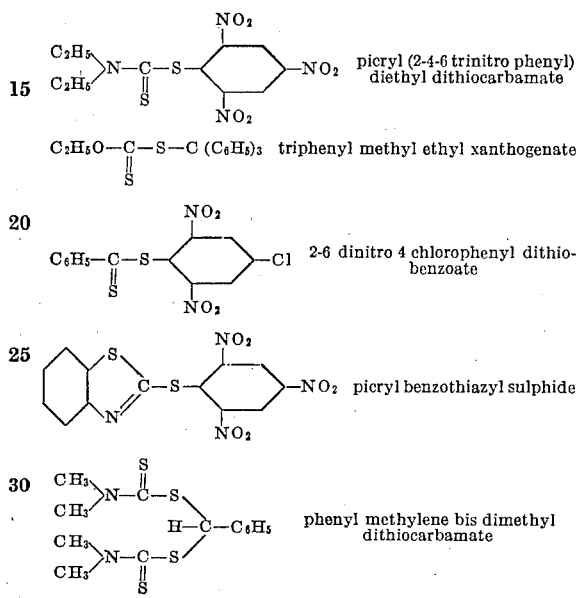

In the examples of polynitro phenyl groups, it will be observed that there is at least one nitro group ortho to the 1-position, and that at least one of the remaining substituents is meta to the aforesaid nitro group. In the dinitro phenyl groups, the two nitro groups are meta to each other, and at least one of them is ortho to the 1-position.

All of the compounds disclosed herein may be prepared according to the same general procedure, namely, treating a solution of a salt (preferably the sodium salt) of the thiol acid, thiazol, xanthogenate, dithiobenzoate, etc., with a solution of the chloride of the substituted group comprising Y. For example a solution of sodium dimethyl dithiocarbamate may be treated with a solution of 2-4 dinitro chlor benzol or benzal chloride.

The whole compound such as 2,4 dinitrophenyl dimethyl dithiocarbamate reacts at least as rapidly with sodium hydroxide in boiling aqueous alcohol as diphenylmethyl dimethyl dithiocarbamate reacts under the same conditions. All the compounds which react with sodium hydroxide at least as rapidly as diphenylmethyl dimethyl dithiocarbamate, accelerate vulcanization, in the presence of a metallic oxide, such as zinc oxide or an equivalent metallic compound.

Zinc oxide is a good illustration of a metallic oxide which may be used. In place of zinc the following elements may be used in combined form preferably somewhat basic and soluble in rubber; mercury preferably in the mercuric state, lead preferably in the plumbous state, cadmium, copper preferably in the cupric state, arsenic preferably in the arsenous state, manganese preferably in the manganous state. Preferably the metallic compound is of such a nature that the metallic element is available during the vulcanization process. Oxides, stearates, carbonates are among the metallic compounds which may be used.

The addition of acid retards the action of the accelerator and therefore improves its resistance to burning. Here again the action is particularly marked in the case of the polynitrophenyl compounds. For instance .1 part of monochlor acetic acid added to the stock given above so affects the action of the accelerator that after 60 minutes at 5 pounds steam pressure, no cure was obtained and after 60 minutes at 40 pounds steam pressure the tensile was 2380 pounds. If .5 part of monochlor acetic acid were used no cure was obtained even after 60 minutes at 40 pounds steam pressure. Other acids which I have successfully employed are sulphanilic, oxalic, picric, phosphoric, trichloracetic, para toluene sulphonyl chloride and pine tar. I have also successfully employed substances which may form acids during the course of vulcanization such as ethyl oxalate or zinc acetate.

Since the presence of acid retards the action of compounds disclosed herein and particularly the action of the polynitrophenyl compounds, the addition of an appropriate amount of acid serves to increase the resistance to burning as much as may be desired. Mixes which are slightly acid because of the presence of carbon black or pine tar resist burning on the mill abnormally well. The vulcanization of rubbers which are acid by nature, or contain appreciable amounts of acid or acidic ingredients, is not accelerated so well by the herein described compounds, unless the acidic property be first removed or neutralized.

Likewise, rubbers or rubber stocks which are appreciably basic by nature, or contain basic materials, may display a marked, often undesirable tendency towards prevulcanization. Such basic rubbers or stocks may be treated with acidic material to remove, to curb, or to control this tendency to prevulcanize. Therefore, by the use of basic material and acidic material in suitable proportions as required, any rubber or stock may be brought to a predetermined speed of vulcanization.

Similar results have been obtained with 2,4 dinitrophenyl benzothiazyl sulphide. The action of the acids is most marked with the dinitrophenyl compounds but the acids also function with the other compounds disclosed herein such as triphenylmethyl diethyl dithiocarbamate for instance.

As an example of the introduction by diffusion of some of the compounds disclosed herein, the following illustration is given. 100 parts of pale crepe, 10 parts of zinc oxide, 3 parts of sulphur, 1 part of 2,4 dinitrophenyl dimethyl dithiocarbamate and .2 part of monochlor acetic acid are mixed to form one stock which is calendered to a thickness of .010''. Another stock is made up of 100 parts of pale crepe, 10 parts of zinc oxide, 3 parts of sulphur and 4 parts of dibenzylamine. This stock is mixed on the mills in the usual manner and calendered to a thickness of .010''. The two stocks are plied up alternately using 3 plies of each and allowed to stand for 24 hours to permit the diffusion of the dibenzylamine into the dinitrophenyl stock and of the dinitrophenyl dimethyl dithiocarbamate into the dibenzylamine stock. Thereafter the plied up stock is heated at 212° and it is found that vulcanization occurs much more quickly than it does for the individual stocks which have not been plied up. It will be observed that the dibenzylamine acts to neutralize the monochlor acetic acid as well as to activate the dinitrophenyl dimethyl dithiocarbamate.

As pointed out before the presence of the monochlor acetic acid improves the resistance to burning but the procedure may also be carried out without the use of the acid.

Other compounds disclosed herein may be substituted for the compounds given above.

Basic material (ammonia, etc.) may be introduced from a surrounding medium such as air or water to neutralize the acids and/or to activate the accelerator. For instance if .2 part of acid be added to the stock for air cure given above, and the stock be cured in air containing ammonia gas the ammonia will not only neutralize the acid but will activate the dinitrophenyl compound. The basic material may be introduced in any desired manner at any time prior to complete vulcanization as a gas or vapor, or it may be applied to the stock by painting, dipping, or blending in cement form, etc. before the stock is subjected to vulcanization, or the stock may be vulcanized in a solution or suspension of the basic material.

It is believed that the dinitrophenyl compounds are particularly susceptible to the action of acids and alkalies because the dinitrophenyl compounds of all sorts of acids such as dimethyl dithiocarbamic acid or hydrochloric acid do not hydrolyze in acid solution but do hydrolyze readily in the presence of an alkali or a base.

Other compounds which may be employed according to the processes disclosed are:

2,4 dinitrophenyl diethyl dithiocarbamate (M.P.81°C.).

2,4 dinitrophenyl di-normal propyl dithiocarbamate.

2,4 dinitrophenyl di-isobutyl dithiocarbamate (M.P.84°C.).

2,4 dinitrophenyl di-normal butyl dithiocarbamate.

2,4 dinitrophenyl di-iso amyl dithiocarbamate (M.P.52-54°C.).

2,4 dinitrophenyl dibenzyl dithiocarbamate (M.P.106°C.).

2,4 dinitrophenyl morpholine dithiocarbamate (2,4 dinitrophenyl oxy-di-ethylene dithiocarbamate) (M. P. 125-130° C.).

2,4 dinitrophenyl dicyclohexyl dithiocarbamate (M. P. 127° C.).

2,6 dinitro 4 chloro phenyl diethyl dithiocarbamate (M. P. 123° C.).

It will be noted that in these compounds, the nitrogen atom holds at least one aliphatic or alkyl group and is preferably disubstituted. These compounds may also be regarded as thiol esters, the ester group being attached to thiol sulphur. They are illustrative of compounds containing

where R is nitrogen and X is sulphur.

Further examples include organic derivatives of thiazoles:

2,4 dinitrophenyl benzothiazyl sulphide (M. P. 167° C.).

Picryl benzothiazyl sulphide (M. P. 152° C.).

2,6 dinitro 4 chlorophenyl benzothiazyl sulphide (M. P. 167° C.).

Allyl benzothiazyl sulphide (B. P. 145-148° C.).

Diphenylmethylbenzothiazyl sulphide (M. P. 108° C.).

The last mentioned compounds illustrate compounds in which R and X of the formula

are joined, and R=S, X=N. In this instance the general formula may be written

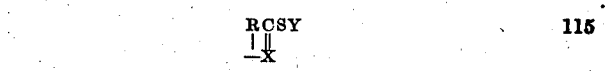

or

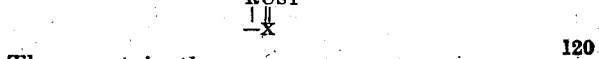

They contain the group

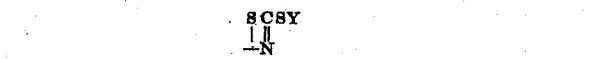

or

Other derivatives may also be used.

As further illustrations of compounds the following may be given:

Phenyl chlor methylene (bis) diethyl dithiocarbamate (M. P. 176–177° C.).

Phenyl methylene bis benzothiazyl sulphide (M. P. 114° C.).

Phenyl methylene bis diethyl dithiocarbamate (M. P. 110° C.)

Phenyl methylene bis dimethyl dithocarbamate (M. P. 180–182° C.).

Other compounds are triphenylmethyl diethyl dithiocarbamate (M. P. 150–155° C.), diphenylmethyl diethyldithiocarbamate (M. P. 85° C.), triphenylmethyl di-isoamyl dithiocarbamate (M. P. 89–90° C.), triphenylmethyl di-normal-propyl dithiocarbamate (M. P. 66–67° C.), diphenylmethyl dimethyl dithiocarbamate (M. P. 96.5–97° C.).

Another type is shown in tertiary butyl diethyl dithiocarbamate.

Still further illustrations are allyl diethyl dithiocarbamate (B. P. 110—111° C.), phthalimido methyldiethyl dithiocarbamate (M. P. 122° C.), di-iodo methyl dimethyl dithiocarbamate (M. P. 76° C.), and trimethyl methyl diethyl dithiocarbamate respectively.

Triphenylmethyl ethyl xanthogenate and 2,6 dinitro 4 chlorophenyl dithiobenzoate also accelerate vulcanization and constitute examples of xanthogenates (R=O, X=S) and dithiobenzoates (R=C, X=S).

All of the above compounds are new chemicals not recorded in the literature. The preparation of these materials forms the subject matter of separate applications.

All of the above mentioned compounds are accelerators of vulcanization. Some of them give high tensile strength and other valuable physical properties such as improved resistance to abrasion, ageing, and other properties. The claims are therefore to be broadly interpreted as including such treatment of rubber in any form (solid, solution, dispersion) for these purposes, as well as for vulcanization, in which latter instance, it is understood that a vulcanizing agent and a metallic oxide or its equivalent will be added to the rubber, and an antioxidant or other material improving the physical properties of the rubber may be present if desired. It is of course understood that not all of these compounds are of equal accelerating strength, pound for pound, under identical vulcanizing conditions. These accelerators may be used in conjunction with any of the known antioxidants and other materials introduced into rubber to improve ageing and other physical properties.

Diphenyl methyl dimethyl dithiocarbamate, diphenyl methyl diethyl dithiocarbamate, diphenyl methyl benzothiazyl-sulphide, allyl diethyl dithiocarbamate, allyl benzothiazyl sulphide accelerate, but the degree of acceleration is very small, and at present is regarded as of no commercial importance. Phthalimido methyl diethyl dithiocarbamate accelerates vulcanization somewhat more than the diphenyl methyl compounds, and they hydrolyze somewhat more rapidly than diphenyl methyl dimethyl dithiocarbamate. Methyl dimethyl dithiocarbamate, and ethyl benzothiazyl sulphide are examples of compounds which do not hydrolyze as rapidly as diphenyl methyl dimethyl dithiocarbamate in the herein described test, and the pure compounds did not accelerate vulcanization under the conditions given above as examples.

The accelerating compounds in general may be used in amounts varying between $\frac{1}{10}$ and 2 parts on 100 parts of rubber, depending of course on the type of stock, etc.

It is believed that, in general, as the molecular weight of the groups attached to the nitrogen is increased the higher is the vulcanizing temperature, when equi-molecular amounts of accelerator are considered, and the more resistant are the compounds to pre-vulcanization on the mixing mills, and the better is their action with litharge in the absence or presence of zinc oxide.

The rate of reaction of the compound with sodium hydroxide in boiling aqueous alcohol may be determined as follows:

.00125 moles of the compound is weighed into a 50 cc. Erlenmeyer; 25 cc. 95% alcohol and .00125 moles sodium hydroxide in the form of an approximately normal solution are added and the solution brought to the boiling point as quickly as possible and kept there for exactly 30 minutes. The solution is then cooled quickly and titrated with approximately N/10 acid, using phenolphthalein as the indicator. Carbon dioxide-free water should be used throughout. A blank should be run in order to check up on the amount of acid necessary to neutralize the sodium hydroxide when no compound is used. The decrease in hydroxyl ion content during the boiling is taken as a measure of the extent of the reaction with sodium hydroxide.

The above procedure constitutes a method whereby the relative rate of hydrolysis of any given compound of the types disclosed may be compared with that of diphenylmethyl dimethyl dithiocarbamate.

The diphenylmethyl dimethyl dithiocarbamate may be prepared in accordance with the general procedure heretofore indicated, that is reacting together sodium dimethyl dithiocarbamate and diphenyl chloro methane. Diphenylmethyl dimethyl dithiocarbamate separates from the mixture as an oil which solidifies and crystallizes on standing over night and may be purified by recrystallization from alcohol.

It is known that the rate of hydrolysis of organic compounds, and more exactly, their rate of reaction with a base such as sodium hydroxide varies with the substituents in the organic compound. This variation has been utilized in the present invention.

Having thus described my invention, what I claim and desire to protect by Letters Patent is:

1. A method of treating rubber which comprises adding to rubber a vulcanizing combination including a compound comprising the group

in which R represents either N, O, or C or further represents S when X=N; X represents O or S, or further represents N when R=S; and Y represents a carbon atom in a substituted cyclic group, or in a substituted methyl group that does not contain O or S doubly bonded to Y, which compound hydrolyzes in aqueous alcohol in the presence of sodium hydroxide at least as rapidly as diphenyl methyl dimethyl dithiocarbamate under the same conditions, and further adding an acid material capable of retarding the activity of said compound as an accelerator of vulcanization.

2. A method of treating rubber which comprises adding to rubber a vulcanizing combination including a compound comprising the group

in which R represents either N, O, or C or further represents S when X=N; X represents O or S, or further represents N when R=S; and Y represents a carbon atom in a substituted aryl group, or in a substituted methyl group that does not contain O or S doubly bonded to Y, which compound hydrolyzes in aqueous alcohol in the presence of sodium hydroxide at least as rapidly as diphenyl methyl dimethyl dithiocarbamate under the same conditions, and further adding an acid material capable of retarding the activity of said compound as an accelerator of vulcanization.

3. A method of treating rubber which comprises adding to rubber a vulcanizing combination including a compound comprising the group

in which R represents either N, O, or C or further represents S when X=N; X represents O or S, or further represents N when R=S, and Y represents a carbon atom in a substituted phenyl group, or in a substituted methyl group that does not contain O or S doubly bonded to Y, which compound hydrolyzes in aqueous alcohol in the presence of sodium hydroxide at least as rapidly as diphenyl methyl dimethyl dithiocarbamate under the same conditions, and further adding an acid material capable of retarding the activity of said compound as an accelerator of vulcanization.

4. A method of treating rubber which comprises adding to rubber a vulcanizing combination including a compound comprising the group

in which R represents either N, O, or C or further represents S when X=N; X represents O or S, or further represents N when R=S, and Y represents a carbon atom in a substituted cyclic group, which compound hydrolyzes in aqueous alcohol in the presence of sodium hydroxide at least as rapidly as diphenyl methyl dimethyl dithiocarbamate under the same conditions, and further adding an acid material capable of retarding the activity of said compound as an accelerator of vulcanization.

5. A method of treating rubber which comprises adding to rubber a vulcanizing combination including a compound comprising the group

in which R represents either N, O, or C or further represents S when X=N; X represents O or S, or further represents N when R=S, and Y represents a carbon atom in a substituted aryl group, which compound hydrolyzes in aqueous alcohol in the presence of sodium hydroxide at least as rapidly as diphenyl methyl dimethyl dithiocarbamate under the same conditions, and further adding an acid material capable of retarding the activity of said compound as an accelerator of vulcanization.

6. A method of treating rubber which comprises adding to rubber a vulcanizing combination including a compound comprising the group

in which R represents either N, O, or C or further represents S when X=N; X represents O or S, or further represents N when R=S, and Y represents a carbon atom in a substituted phenyl group, which compound hydrolyzes in aqueous alcohol in the presence of sodium hydroxide at least as rapidly as diphenyl methyl dimethyl dithiocarbamate under the same conditions, and further adding an acid material capable of retarding the activity of said compound as an accelerator of vulcanization.

7. A method of treating rubber which comprises adding to rubber a vulcanizing combination including a polynitro phenyl compound of a disubstituted dithiocarbamate, which compound hydrolyzes in aqueous alcohol in the presence of sodium hydroxide at least as rapidly as diphenyl methyl dimethyl dithiocarbamate under the same conditions, and further adding a small amount of an acid material capable of retarding the activity of the dithiocarbamate as an accelerator of vulcanization.

8. A method of treating rubber which comprises adding to rubber a vulcanizing combination including a polynitro phenyl compound of a dialkyl dithiocarbamate, which compound hydrolyzes in aqueous alcohol in the presence of sodium hydroxide at least as rapidly as diphenyl methyl dimethyl dithiocarbamate under the same conditions, and further adding a small amount of an acid material capable of retarding the activity of the dithiocarbamate as an accelerator of vulcanization.

9. A method of treating rubber which comprises adding to rubber a vulcanizing combination including a dinitrophenyl compound of a disubstituted dithiocarbamate, which compound hydrolyzes in aqueous alcohol in the presence of sodium hydroxide at least as rapidly as diphenyl methyl dimethyl dithiocarbamate under the same conditions, and further adding a small amount of an acid material capable of retarding the activity of the dithiocarbamate as an accelerator of vulcanization.

10. A method of treating rubber which comprises adding to rubber a vulcanizing combination including a dinitrophenyl compound of a dialkyl dithiocarbamate, which compound hydrolyzes in aqueous alcohol in the presence of sodium hydroxide at least as rapidly as diphenyl methyl dimethyl dithiocarbamate under the same conditions, and further adding a small amount of an acid material capable of retarding the activity of the dithiocarbamate as an accelerator of vulcanization.

11. A method of treating rubber which comprises adding to rubber a vulcanizing agent, a metallic oxide, 2-4 dinitrophenyl disubstituted dithiocarbamate, and further adding an acid capable of retarding the activity of the dithiocarbamate as an accelertor of vulcanization.

12. A method of treating rubber which comprises adding to rubber a vulcanizing agent, a metallic oxide, 2-4 dinitrophenyl dialkyl dithiocarbamate, and further adding an acid capable of retarding the activity of the dithiocarbamate as an accelerator of vulcanization.

13. A method of treating rubber which comprises adding to rubber a vulcanizing agent, a metallic oxide, 2-4 dinitrophenyl dimethyl dithiocarbamate, and further adding an acid capable of retarding the activity of the dithiocarbamate as an accelerator of vulcanization.

Signed at New York, New York, this 23rd day of February, 1928.

SIDNEY M. CADWELL.

CERTIFICATE OF CORRECTION.

Patent No. 1,777,874.  Granted October 7, 1930, to

SIDNEY M. CADWELL.

It is hereby certified that error appears in the printed specification of the above numbered patent requiring correction as follows: Page 3, line 67, after "carbamate" insert (M. P. 84° C.); same page, line 69, for "84°" read 85°; and that the said Letters Patent should be read with these corrections therein that the same may conform to the record of the case in the Patent Office.

Signed and sealed this 6th day of October, A. D. 1931.

(Seal)

M. J. Moore,
Acting Commissioner of Patents.